United States Patent
Shepard et al.

(10) Patent No.: US 9,558,231 B2
(45) Date of Patent: Jan. 31, 2017

(54) DATA VIEWER FOR CLINICAL DATA

(71) Applicant: ORACLE INTERNATIONAL CORPORATION, Redwood Shores, CA (US)

(72) Inventors: Scott Shepard, Waltham, MA (US); Hanan Butler, Boston, MA (US); Paul Boyd, Dorchester, MA (US); Paul Bradford, Bedford, MA (US); Sai K. Lee, Walpole, MA (US); Michael T. O'Connell, Westford, MA (US); Roxanne Chang, Billerica, MA (US); Christopher Luu, Arlington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 280 days.

(21) Appl. No.: 13/899,861

(22) Filed: May 22, 2013

(65) Prior Publication Data
US 2013/0318106 A1    Nov. 28, 2013

Related U.S. Application Data

(60) Provisional application No. 61/650,538, filed on May 23, 2012.

(51) Int. Cl.
*G06F 7/00* (2006.01)
*G06F 17/30* (2006.01)
*G06Q 10/00* (2012.01)

(52) U.S. Cl.
CPC ... *G06F 17/30371* (2013.01); *G06F 17/30424* (2013.01); *G06Q 10/00* (2013.01)

(58) Field of Classification Search
None
See application file for complete search history.

(56) References Cited

U.S. PATENT DOCUMENTS

| | | | | |
|---|---|---|---|---|
| 4,006,224 | A * | 2/1977 | Prudden | 514/62 |
| 8,370,303 | B1 * | 2/2013 | Ceschim et al. | 707/640 |
| 8,768,916 | B1 * | 7/2014 | Ghazal | G06F 17/30592 707/719 |
| 2004/0015579 | A1 * | 1/2004 | Cooper | H04L 12/2602 709/223 |
| 2004/0193656 | A1 * | 9/2004 | Pizzo | G06F 17/30902 |
| 2005/0177476 | A1 * | 8/2005 | McCandless et al. | 705/32 |
| 2006/0174210 | A1 * | 8/2006 | Richards | G06F 19/3437 715/769 |

(Continued)

*Primary Examiner* — Hexing Liu
(74) *Attorney, Agent, or Firm* — Kraguljac Law Group, LLC (57) ABSTRACT

Systems, methods, and other embodiments associated with a data view for clinical data are described. In one embodiment, a method includes receiving a request from a user to view summarized case report form (CRF) data, where the CRF data corresponds to a plurality case report forms (CRFs) stored in one or more normalized transactional tables. A view query is constructed based, at least in part, on the request and executed on one or more denormalized summary tables to construct a view. The denormalized summary tables store selected CRF data from the normalized transactional tables and are updated concurrently with each update to the transactional tables. The method includes rendering the view for display.

20 Claims, 8 Drawing Sheets

(56) References Cited

U.S. PATENT DOCUMENTS

| | | | |
|---|---|---|---|
| 2007/0240038 A1* | 10/2007 | Rundell et al. | 715/517 |
| 2007/0288261 A1* | 12/2007 | Burke et al. | 705/2 |
| 2008/0043256 A1* | 2/2008 | Broda | G06F 17/211 |
| | | | 358/1.3 |
| 2008/0046506 A1* | 2/2008 | Broda | G06F 9/4443 |
| | | | 709/203 |
| 2008/0046536 A1* | 2/2008 | Broda | 709/217 |
| 2008/0046556 A1* | 2/2008 | Nicholls | G06Q 10/06311 |
| | | | 709/224 |
| 2008/0046803 A1* | 2/2008 | Beauchamp | G06F 17/30563 |
| | | | 715/212 |
| 2008/0208647 A1* | 8/2008 | Hawley et al. | 705/7 |
| 2011/0246220 A1* | 10/2011 | Albert | 705/2 |
| 2012/0246149 A1* | 9/2012 | Horwitz | G06Q 10/10 |
| | | | 707/722 |

* cited by examiner

Figure 8

DATA VIEWER FOR CLINICAL DATA

CROSS REFERENCE TO RELATED APPLICATIONS

This disclosure claims the benefit of U.S. Provisional Patent Application Ser. No. "61/650,538" filed May 23, 2012, titled "DATA VIEWER AND PARTIAL SOURCE VERIFICATION SYSTEMS", inventors: Scott SHEPARD, and assigned to the present assignee, which is incorporated herein by reference in its entirety.

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Clinical data managers analyze summaries of data recorded on case report forms (CRFs) to track the progress of a clinical study or engage in quality control efforts. The CRFs are typically stored in normalized data tables associated with a server that handles CRF processing. The normalized data tables are optimized for transaction processing. Normalized data tables are not optimized for analysis such as summarizing data or processing queries on the data. Thus normalized data tables do not facilitate the types of analysis performed by clinical data managers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

In existing CRF data management systems, denormalized summary versions of normalized CRF transactional data tables may be created to support the types of analysis performed by clinical data managers. However, these denormalized versions of the data tables are not always up to date and do not provide a means for a clinical data manager to access or act upon the CRF data in the normalized data tables. Thus, the summaries received by clinical data managers are only accurate as of the last update. Further, making changes to CRFs is often a two step process. The CRF manager first runs reports on the denormalized tables and notes which records need changes. Then the clinical data manager logs into the CRF processing server to access and change the records. Systems and methods are described herein that provide up-to-date summary data and enable clinical data managers to act upon CRF data stored in the normalized transactional data from a same view that displays denormalized summary data.

Figure 1:
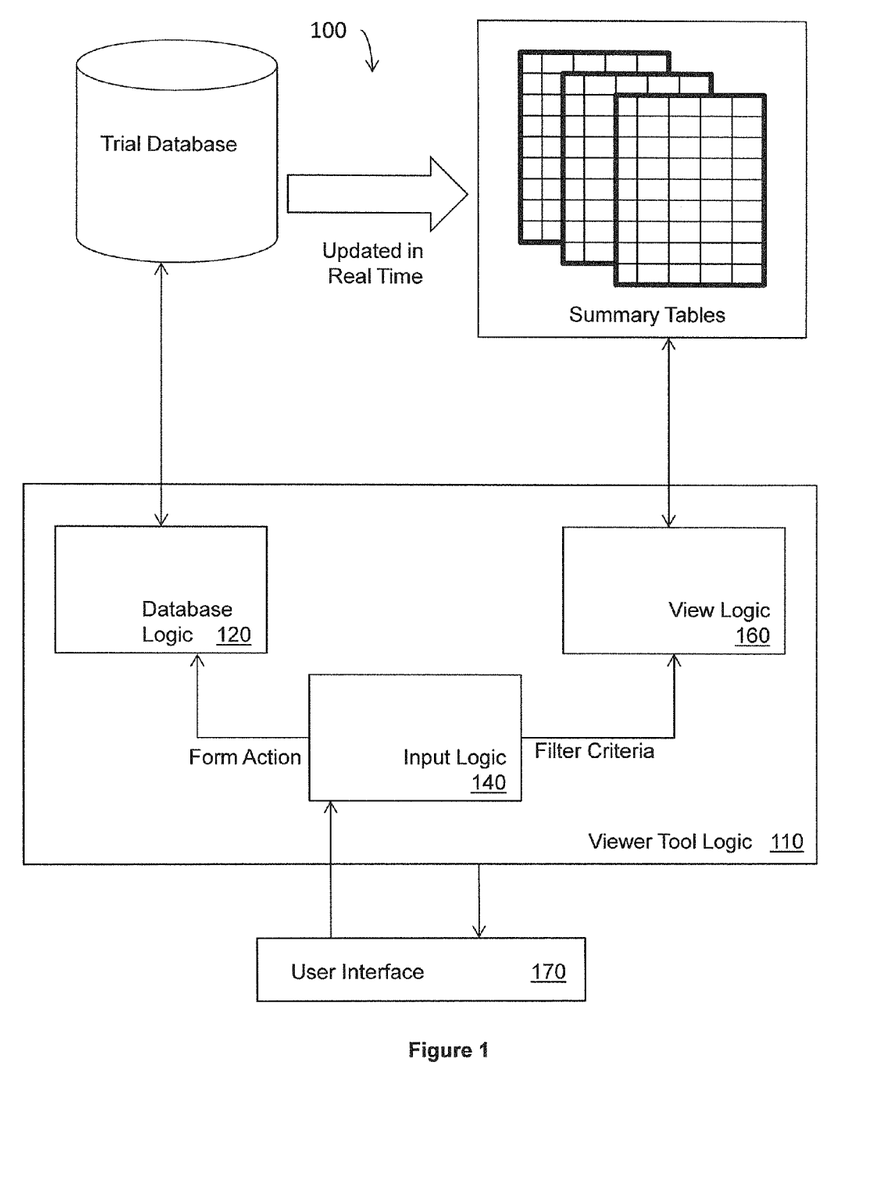
FIG. 1 illustrates one embodiment of a system associated with a clinical data viewer.

With reference to FIG. 1, one example embodiment of a system 100 associated with a clinical data viewer is illustrated. The system 100 includes a viewer tool logic 110 that is configured to act on a trial database and a set of summary tables to provide a view of CRF data on a user interface 170. The trial database is a transactional database associated with a CRF processing server that receives CRF data. The CRF data may be received from a web interface accessed by clinic personnel to input the CRF data or some other means, such as an integration of data from another system. The trial database stores CRF data in normalized data tables that are optimized for processing insert, delete, and edit operations quickly. The normalized tables are not optimized for query processing. The summary tables are denormalized versions of the normalized transactional data tables that have been optimized for the types of queries typically received from clinical data managers. The summary tables are tied to the trial database so that the summary tables are automatically updated when the updates are submitted to the trial database.

The viewer tool logic 100 includes an input logic 140 that is configured to receive criteria from a user specifying what CRF data the user wishes to view. The user may input filter criteria that specifies which CRF records are to be displayed. The input logic 140 invokes the view logic 160 to create a view query on the summary tables to return a view that includes data specified by the user's filter criteria. The view query will typically include a number of aggregation functions that return counts of forms by state, and so on. When no filter criteria are input by the user, the view logic 160 may execute a default view query to return a default view to be displayed to the user.

An important feature in CRF processing systems is the ability to assign a form state to each CRF (e.g., row) so that a clinical data manager can understand whether a given form has been started, is complete, has been reviewed, or has an outstanding discrepancy query, and so on. A discrepancy query is a flag that is attached to a form instance or item when a user believes that the form or item should be confirmed or corrected. The data tables in the trial database and the summary tables include one or more columns that record form state for each CRF. The view query will often provide a count of CRFs by state or group forms in a display by their state.

In one embodiment, the following form states are provided. The Completeness of Form state can be assigned a value of not started/incomplete/complete. The Queries state refers to discrepancy queries and can be assigned a value of candidate/open/answered/closed. A form may also be in a frozen state or a locked state. CRF data is typically manually reviewed to verify that is correct. Five customizable review states are provided with up to three stages each that can be labeled for a given study. For example, review stages of needs review/pending/reviewed may be assigned to a form.

The user may input a form action command that is to be performed on CRF data in the trial database. A form action command specifies a form state to be assigned to one or more CRFs. Form action commands include freezing/unfreezing a form, locking/unlocking a form, verifying a form, and setting a review state for a form. Form action commands also include actions that open and answer discrepancy queries. When a form action command is received, the input logic 140 invokes a database logic 120 that communicates with the CRF processing server for the trial database to perform the form action command. A progress bar that reports the progress of the form action in the trial database may be rendered on the user interface 170.

Figure 2:
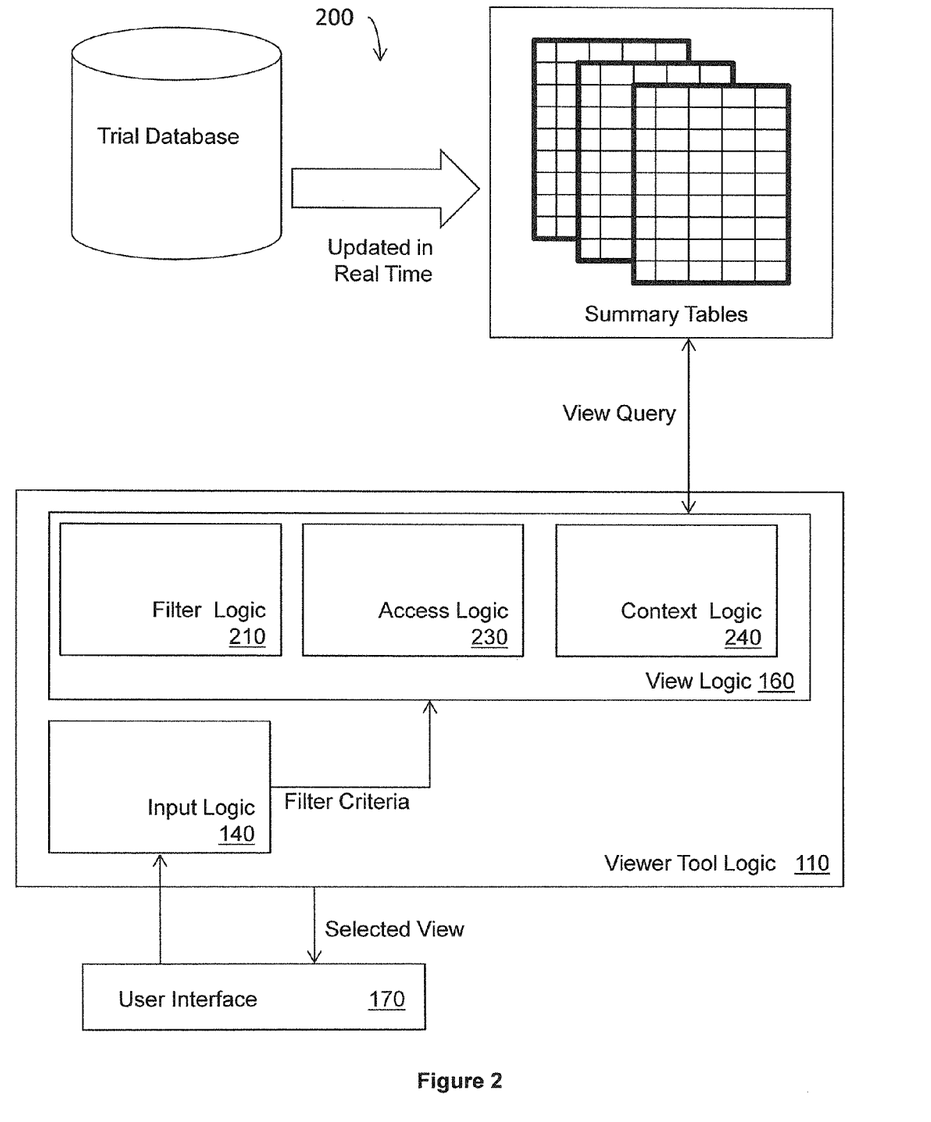
FIG. 2 illustrates an embodiment of a system associated with a clinical data viewer.

FIG. 2 illustrates a system 200 that includes one example embodiment the view logic 160. The view logic 160 includes a filter logic 210, an access logic 230, and a context logic 240. The filter logic 210 is configured to convert filter criteria received from the input logic into query predicates that are appended to the view query executed by the view logic 160. For example, a user may request a summary of data for CRFs entered during a specific time interval. The filter logic converts the time interval into a query predicate for the view query that selects data for CRFs in that time interval. The filter logic 210 may access stored filter criteria for a given user and provide the stored filter criteria for display to, and selection by, the user.

The access logic 230 is configured to determine access rights for the user. The access logic 230 may access a repository of access rights to retrieve the access rights of a given user. The view logic 160 creates a query predicate that limits results to data to which the user has access, as determined by the access logic 230. For example, if a user only has access to a certain clinical site, the access logic 230 will create a query predicate that selects rows of CRF data for the site. Access by users may also be limited to certain columns of data, for example, some users may be able to view CRF data but not be able to view form review state columns. By virtue of the access-based query predicate, any aggregation functions that are performed by the view query will correspond to CRF data to which the user has access and will not include aggregation of any data to which the user does not have access.

The context logic 240 is configured to retrieve context information for the user. Context information may correspond to a geographic location or some preference for a user. The context information may be used by the view logic 160 to create a query predicate that tailors the view based on the user's context. For example, if a user's context information indicates that he is in Japan, the view query may select Japanese language labels for the view columns. If a user's context information indicates that she is in a group that tracks form state as a primary task, a default view query may group the forms in the view by form state.

In one embodiment, there are two types of views: a summary view and a detailed view. The summary view type summarizes CRF data by site and by visit. The summary view displays a summarized state of operational data and is intended to show the state of the trial as a whole (e.g., what forms and visits have been completed and reviewed). The user may view form state grouped by visits or sites. A visit refers to any time a study subject visits a site and each visit may generate several forms. The detailed view shows actual clinical data of given forms in a tabular manner. In the detailed view, a user can see form data for multiple subjects across multiple visits in a single view.

Figure 3A:
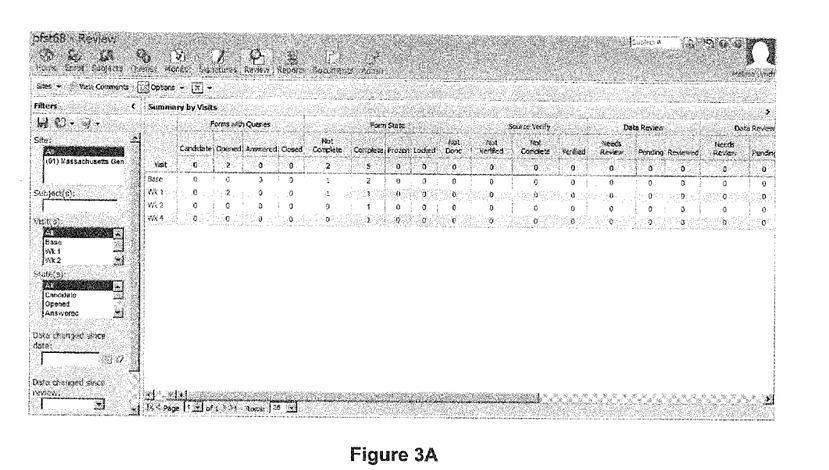
FIGS. 3A and 3B illustrate example screen shots of one embodiment of a clinical data viewer.

FIG. 3A is an example of a summary type view that provides summary information broken out by visit. A central summary table provides a view of the overall operational status of the trial. A user can choose to view the trial broken down by visits or sites. The table summarizes each visit or site by a row with counts of various states. Each count of state is a count of how many form instances have the particular state. For example, the count of open queries is the count of how many form instances have open discrepancy queries.

States are shown across the top of the table as column headers. State items are grouped together as a category and are shown as an overarching column heading. For example, Queries (which refers discrepancy queries, not view queries) is broken down into Candidate, Open, Answered, and Closed. The header columns also show the totals of each state for the user's viewable records across the entire trial. These counts are limited to the data population viewable by the user. In other words, if a user only has access rights to 5 of 20 sites in the trial, the totals in the header are for the 5 sites. Also, the counts are subjected to the filter criteria but not limited to the current page. Pagination has no effect on summing the counts. The summing process is done real time in response to the view query that applies the user's access rights, context, and any filter criteria.

The leftmost column of the display in 3A contains information about the data in the summary table. Boxes in the column allow a user to input filter criteria. The user may select from the boxes in the leftmost column to submit a filter criteria. For example, the user may select a site, a visit, a form state, or specify a given subject. The selections made in the boxes are used to create predicates for the view query.

Figure 3B:
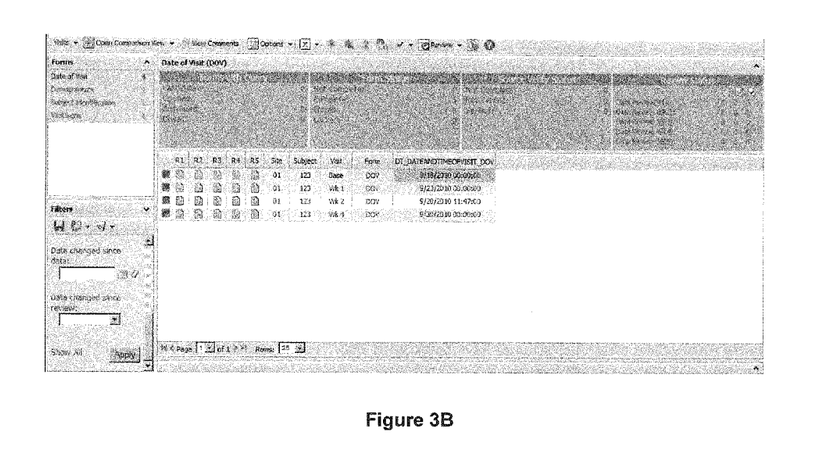

FIG. 3B illustrates an example record listing view that is a detailed type view. The record listing view displays clinical data per form that may span across sites, subjects, and visits. The record listing view includes a form selector box that allows a user to select a form from a list of forms ordered according to visit. The view also includes a filter panel in which a user can select from various filter criteria. The table includes a state summary pane that displays a count of states for available form instances. Each individual state is shown with the count of forms with that state. States are grouped into categories for presentation. Within the states summary pane, each state is clickable. Clicking on a state will add that state to the current filtering criteria, having the same effect as selecting the state in the filter panel.

A data table shows all data of the selected form filtered by criteria listed in the filter panel. Each row in the table represents a single form instance. The columns of the table represent individual data items in the form. For example, a demographic form has a gender, date of birth, race, height, and marital status as columns. Any time a subject identifier appears in a cell, the cell may be selected to navigate (e.g., executing a view query with the subject number as a filter criterion) to the record listing view for the subject.

Figure 4:
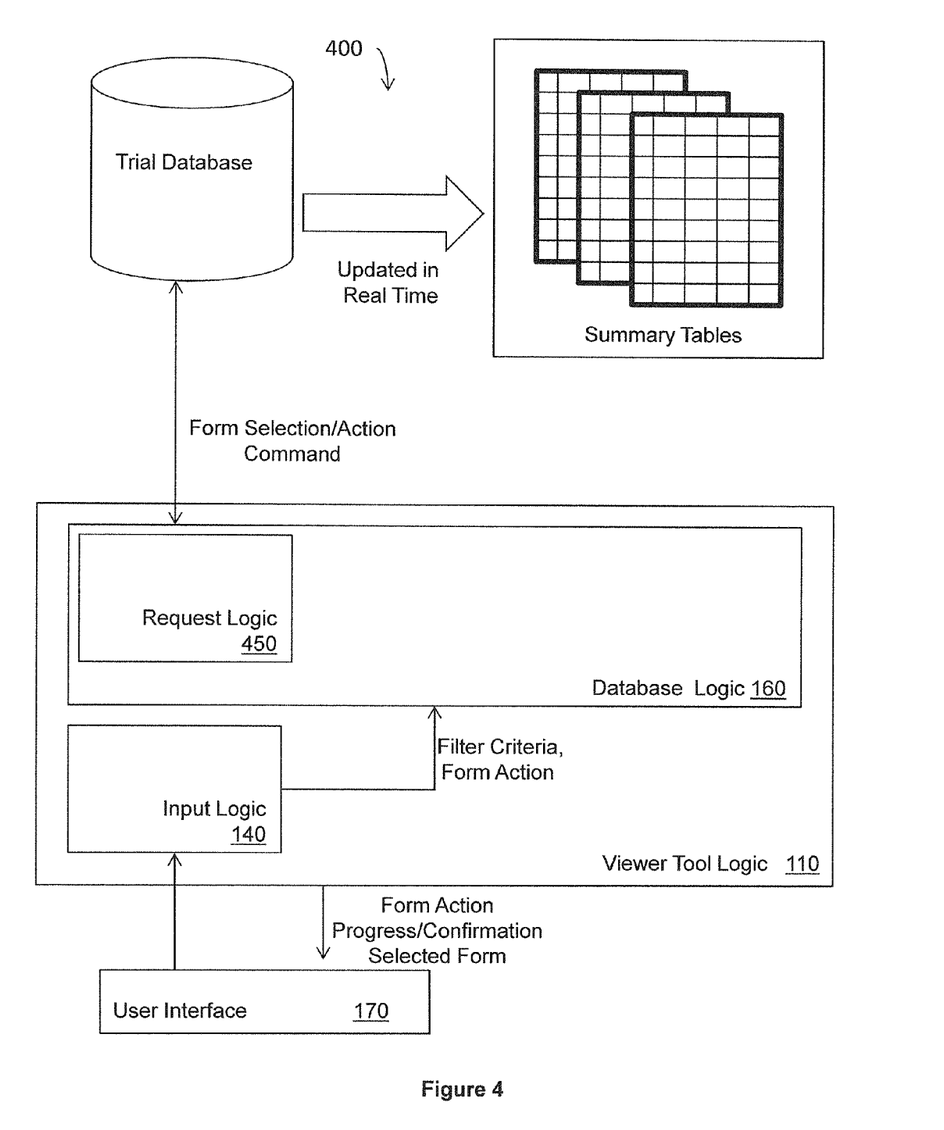
FIG. 4 illustrates an embodiment of a system associated with a clinical data viewer.

FIG. 4 illustrates an example embodiment of a system 400 that includes one embodiment of the database logic 160. Recall that the database logic 160 allows a user to view actual form instances and to act upon CRF data in the trial database from the same user interface that displays the views on the summary tables. To enable this interaction, the database logic 160 includes a request logic 450 that communicates with the server that hosts the trial database.

Figure 5:
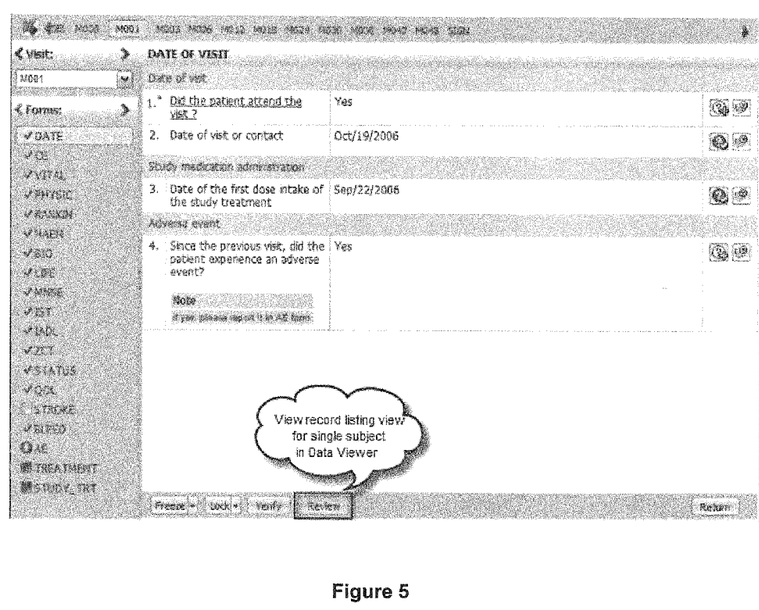
FIG. 5 illustrates an example screen shot of one embodiment of a clinical data viewer.

Users can navigate between CRF data in the trial database and views on the summary tables using the same user interface 170. A user may access CRF form data in the trial database by selecting an option in the record display view (FIG. 3B). FIG. 5 illustrates a display screen of a CRF form instance recording data for a given subject on a given visit that is provided by the CRF processing server. The review button at the bottom of the screen in FIG. 5 may be actuated to navigate to a record listing view on the summary tables filtered by the current site and subject.

Returning to FIG. 4, the request logic 450 is configured to create and submit requests to the server hosting the trial database based on user specified filter criteria and form action. In one embodiment, the request logic 450 handles communication with the CRF processing server in a manner that is transparent to the server, and no adaptations need to be made to the CRF processing system to support the viewer tool logic 110. As will be discussed in more detail below, FIG. 7 outlines one method that may be used by the request logic 450 to display form instances and edit data in the trial database.

Figure 6:
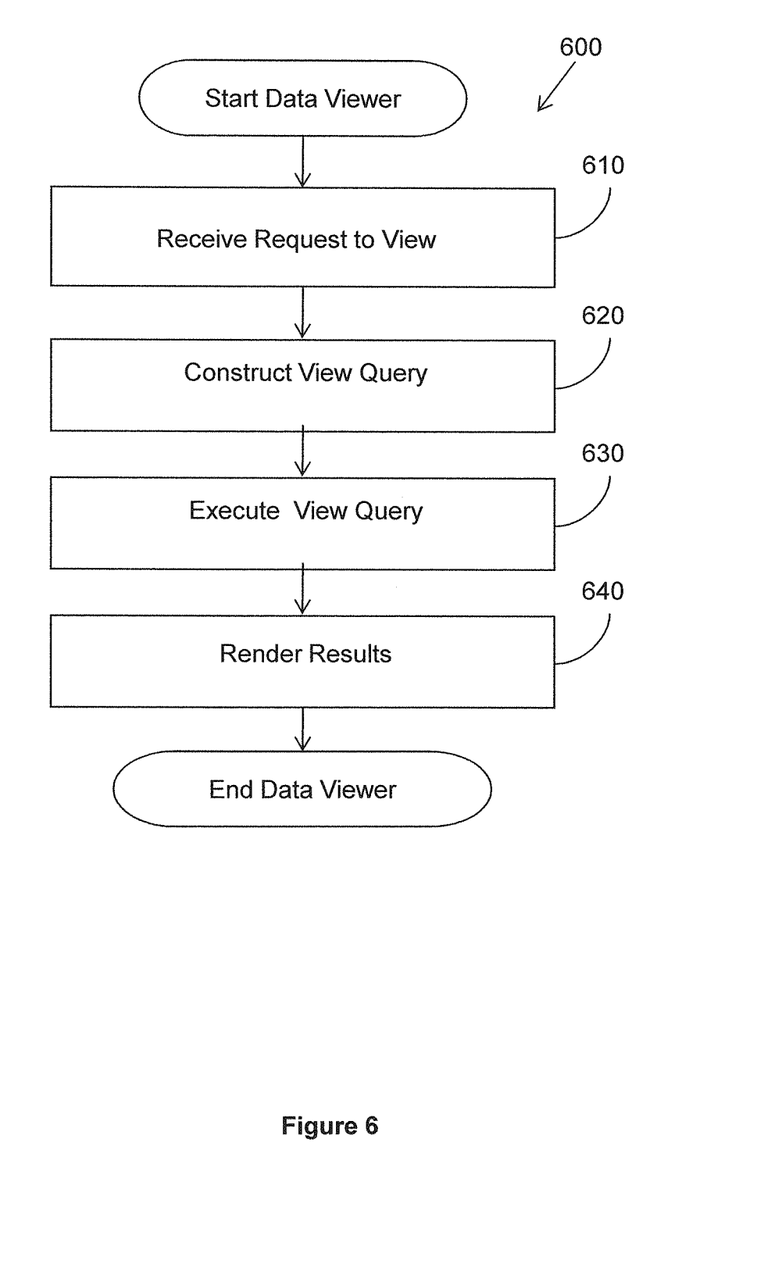
FIG. 6 illustrates an embodiment of a method associated with a clinical data viewer.

FIG. 6 illustrates one embodiment of a method 600 for providing a data viewer for CRF data. The method includes, at 610, receiving a request from a user to view summarized CRF data. The CRF data corresponds to a plurality CRFs that were originally stored in one or more normalized transactional tables during CRF transaction processing. The method includes, at 620, constructing a view query based, at least in part, on the request. The view query includes filter criteria that may be provided from several sources. For example, the view query may include filter criteria that were input by a user by way of selection filter criteria on a display or typing a date range into user interface. The view query may include filter criteria that specify a user's access rights so that only data to which the user has access are returned by the view query. The view query may also include filter criteria based on the user's context, such as a preferred language selected based on the user's geographic location.

The method includes, at 630, executing the view query on one or more denormalized summary tables to construct a view. The denormalized summary tables store selected CRF data from the normalized transactional tables. The denormalized summary tables are updated concurrently with each update to the transactional tables so that the results of the view query are up to date with respect to the CRF form processing data. The method includes, at 640, rendering the results as a view for display.

In one embodiment, the data viewer system is implemented in a client side browser that accesses a database storing one or more denormalized summary tables. The summary tables summarize selected CRF data from normalized transactional tables associated with a CRF processing server that is accessed by the client side browser via the Internet. The denormalized summary tables, which may be accessed via the CRF processing server, are updated concurrently with each update to the transactional tables. Requests to view summarized case report form (CRF) data are submitted by a user with a web browser. A view query is constructed based, at least in part, on the request from the client side. The view query is executed on the one or more summary tables on the sever-side to construct a view. The view is then rendered for display.

Figure 7:
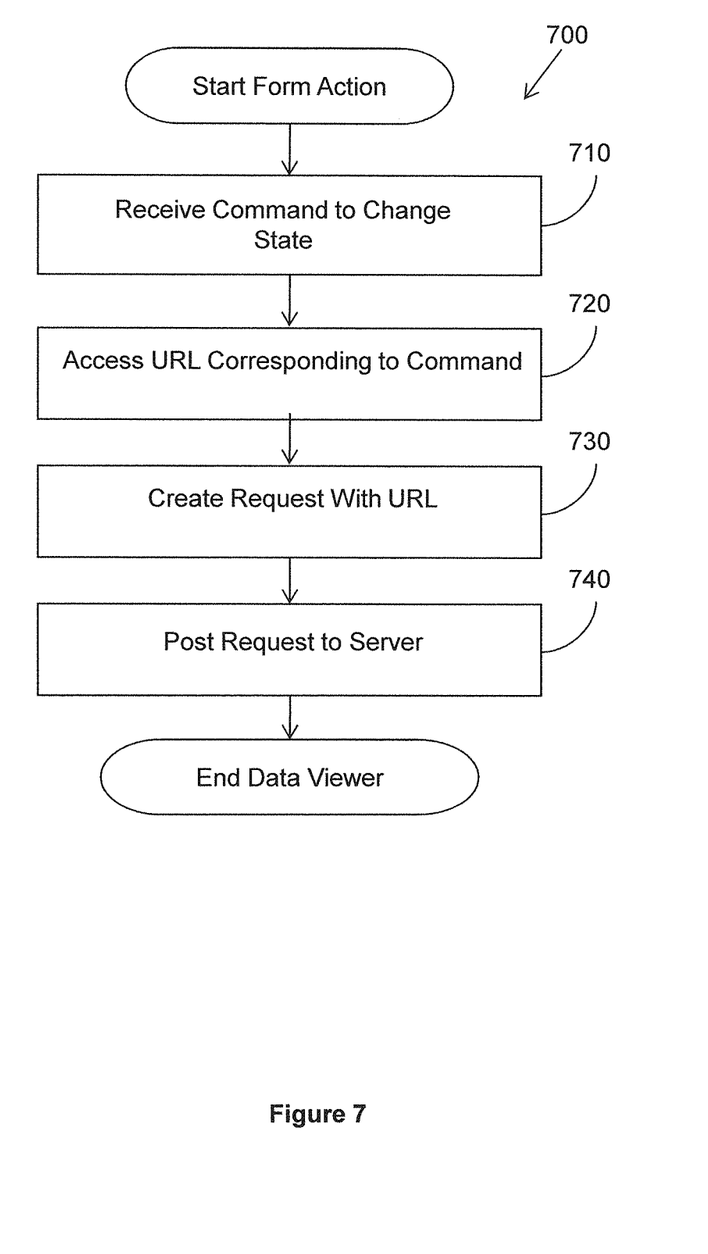
FIG. 7 illustrates another embodiment of a method associated with a clinical data viewer.

FIG. 7 illustrates one example method of performing a state-related form action on CRF data in the transactional data tables via a client side data viewer. The method includes, at 710, receiving, by a user acting on the view on the client-side, a form action command that specifies at least one form state action and one or more target CRFs. The target CRFs may be selected by a user by selecting forms on display screen. A pop up box may prompt a user to enter the desired state for the selected forms. The method includes, at 720, identifying a stored URL that corresponds to the form state action. The method includes, at 730, creating a request that includes the identified URL. An example of a URL that freezes a form is:

```
http://exapp123.nw.sl.com/pfst45/pfts.dll?S=32645944&C=
TM__37&SI=12057&FV=0&NM=0&IP=13125__0;
12599__0!1.000;7986__281371255750021.000!1.000&
FS=12599;0;1.000&RM=2
```

The method includes, at 740 posting the request to the CRF processing server. A progress bar may be rendered that communicates the progress of the state change operation in the CRF processing system data tables.

As can be seen from the foregoing description, the systems and methods described herein provide a data viewer tool that displays up-to-date summary information and allows a user to navigate to and act upon forms stored in a transactional database.

Computer Embodiment

Figure 8:
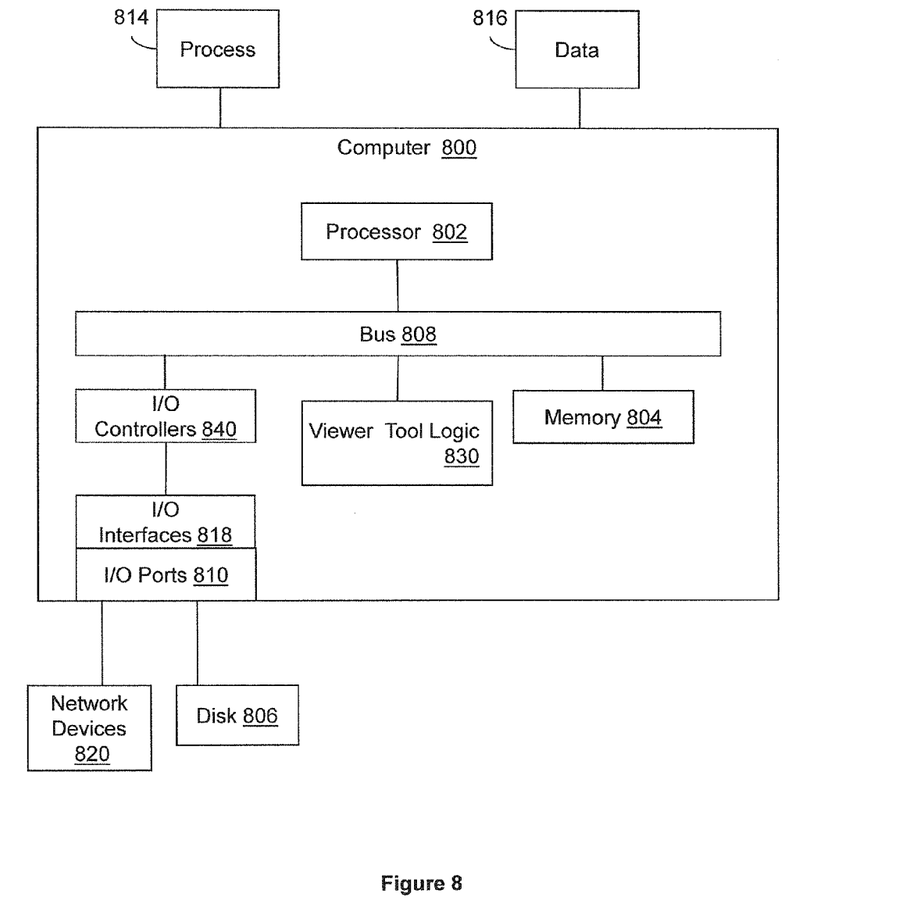
FIG. 8 illustrates an embodiment of a computing system in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a viewer logic 830 configured to facilitate viewing summarized CRF data. In different examples, the viewer logic 830 may be implemented in hardware, a non-transitory computer-readable medium with stored instructions, firmware, and/or combinations thereof.

While the viewer logic 830 is illustrated as a hardware component attached to the bus 808, it is to be appreciated that in one example, the viewer logic 830 could be implemented in the processor 802.

In one embodiment, logic 830 is a means (e.g., hardware, non-transitory computer-readable medium, firmware) for viewing summarized CRF data.

The means may be implemented, for example, as an ASIC programmed to create and render views of summarized CRF data. The means may also be implemented as stored computer executable instructions that are presented to computer 800 as data 816 that are temporarily stored in memory 804 and then executed by processor 802.

Viewer logic 830 may also provide means (e.g., hardware, non-transitory computer-readable medium that stores executable instructions, firmware) for viewing and acting upon CRF data.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods outlined with respect to FIGS. 1-7.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Logic", as used herein, includes a computer or electrical hardware component(s), firmware, a non-transitory computer readable medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by a computer cause the computer to:
   generate and store one or more denormalized summary tables that are denormalized versions of one or more normalized transactional tables, wherein the one or more normalized transactional data tables store a plurality of records corresponding to case report forms (CRFs) stored by a CRF processing server that processes CRF data;
   receive a request from a user to view case report form (CRF) data that is summarized;
   construct a view query based, at least in part, on the request;
   execute the view query on the one or more denormalized summary tables to construct a summary table view that includes denormalized data from the one or more denormalized summary tables;
   render the summary table view for display to the user in a first user interface display;
   provide access to the one or more normalized transactional data tables via the first user interface display, wherein both the display of the summary table view including the denormalized data and the access to the normalized transactional data tables occur in the same first user interface display;
   in response to receiving via the first user interface display an access request including a form action command that specifies at least one form action and a target CRF:
      communicate the form action command to the CRF processing server to cause the CRF processing server to modify a record corresponding to the target CRF in the one or more normalized transactional data tables to perform the form action; and
      in response to modifying the record in the one or more normalized transactional data tables, concurrently updating corresponding records in the denormalized summary tables.

2. The non-transitory computer-readable medium of claim 1, further comprising instructions, that when executed by the computer, cause the computer to receive a filter criterion from the user and including the filter criterion in the view query.

3. The non-transitory computer-readable medium of claim 2, further comprising instructions, that when executed by the computer, cause the computer to determine access rights for the user and creating a corresponding filter criterion that excludes CRF data to which the user has no access rights.

4. The non-transitory computer-readable medium of claim 2, further comprising instructions, that when executed by the computer, cause the computer to receive context information from a user and creating a corresponding filter criterion based on the context information.

5. The non-transitory computer-readable medium of claim 4, further comprising instructions, that when executed by the computer, cause the computer to determine a preferred language selection based on the context information and creating a corresponding filter criterion that specifies the preferred language.

6. The non-transitory computer-readable medium of claim 1, further comprising instructions, that when executed by the computer, cause the computer to:
   create a request to perform the form action on the target CRFs; and
   transmit the request to the CRF processing server.

7. The non-transitory computer-readable medium of claim 2, further comprising instructions, that when executed by the computer, cause the computer to i) determine an access right for a user that generated the request and ii) create a corresponding filter criterion such that only data to which the user has access is included in the summary table view.

8. The non-transitory computer-readable medium of claim 1, where one or more of the normalized transactional data tables and one or more of the denormalized summary tables include a column that stores data representing a form state for a CRF stored in the row, and wherein the non-transitory computer-readable medium stores further instructions, that when executed by the computer, cause the computer to construct a view query that aggregates CRFs based, at least in part, on the form state.

9. The non-transitory computer-readable medium of claim 1, where one or more of the normalized transactional data tables and one or more of the denormalized tables includes a column that stores data representing a form state for a CRF stored in the row, and wherein the non-transitory computer-readable medium stores further instructions, that when executed by the computer, cause the computer to:
   receive a form state action command that specifies a form state and a target CRF;
   communicate the form action command to the CRF processing server to cause the CRF processing server to modify the record corresponding to the target CRF in the one or more normalized transactional data tables to change the form state value to the specified form state.

10. A computing system, comprising:
   a processor;
   a viewer tool logic stored on a non-transitory computer readable medium including instructions that when executed by the processor cause the processor to:
   generate and store one or more denormalized summary tables that are denormalized versions of one or more normalized transactional tables, wherein the one or more normalized transactional data tables store a plurality of records corresponding to case report forms (CRFs) stored by a CRF processing server that processes CRF data;
   receive a request from a user to view case report form (CRF) data that is summarized;
   construct a view query based, at least in part, on the request;
   execute the view query on the one or more denormalized summary tables to construct a summary table view that includes denormalized data from the one or more denormalized summary tables;
   render the summary table view for display to the user in a first user interface display;
   provide access to the one or more normalized transactional data tables via the first user interface display, wherein both the display of the summary table view including the denormalized data and the access to the normalized transactional data tables occur in the same first user interface display;

in response to receiving via the first user interface display an access request including a form action command that specifies at least one form action and a target CRF:

communicate the form action command to the CRF processing server to cause the CRF processing server to modify a record corresponding to the target CRF in the one or more normalized transactional data tables to perform the form action; and in response to modifying the record in the one or more normalized transactional data tables, concurrently updating corresponding records in the denormalized summary tables.

11. The computing system of claim 10, where the view tool logic further comprises stored instructions that when executed by the processor cause the processor to:

create a request to perform the form action on the target CRFs; and transmit the request to the CRF processing server.

12. The computing system of claim 10, where the view logic further comprises:

a filter logic configured to cause the processor to receive a filter criterion from the input logic; and where the view logic is configured to cause the processor to construct a view query that includes filter criterion.

13. The computing system of claim 10, where the view logic further comprises:

an access logic configured to cause the processor to determine access rights for the user; and where the view logic is configured to cause the processor to construct a view query that excludes CRF data to which the user has no access rights.

14. The computing system of claim 10, where the viewer tool logic further comprises stored instructions that when executed by the processor cause the processor to:

determine a preferred language selection based on context information for the user; and construct a view query that specifies the preferred language.

15. The non-transitory computer-readable medium of claim 9, further comprising instructions, that when executed by the computer, cause the computer to:

identify a stored URL that corresponds to the form state action;

create a request that includes the identified URL; and post the request to the CRF processing server.

16. A computer-implemented method performed by a computing device including at least one processor, the method comprising:

generating and storing, by the at least one processor, one or more denormalized summary tables that are denormalized versions of one or more normalized transactional tables, wherein the one or more normalized transactional data tables store a plurality of records corresponding to case report forms (CRFs) stored by a CRF processing server that processes CRF data;

receiving, by the at least one processor, a request from a user to view case report form (CRF) data that is summarized;

constructing, by the at least one processor, a view query based, at least in part, on the request;

executing, by the at least one processor, the view query on the one or more denormalized summary tables to construct a summary table view that includes denormalized data from the one or more denormalized summary tables;

rendering, by the at least one processor, the summary table view for display to the user in a first user interface display;

providing, by the at least one processor, access to the one or more normalized transactional data tables via the first user interface display, wherein both the display of the summary table view including the denormalized data and the access to the normalized transactional data tables occur in the same first user interface display;

in response to receiving, by the at least one processor via the first user interface display, an access request including a form action command that specifies at least one form action and a target CRF:

communicating, by the at least one processor, the form action command to the CRF processing server to cause the CRF processing server to modify a record corresponding to the target CRF in the one or more normalized transactional data tables to perform the form action; and in response to modifying the record in the one or more normalized transactional data tables, concurrently updating, by the at least one processor, corresponding records in the denormalized summary tables.

17. The computer-implemented method of claim 16 further comprising:

creating a request to perform the form action on the target CRFs; and transmitting the request to the CRF processing server.

18. The computer-implemented method of claim 16, where one or more of the normalized transactional data tables and one or more of the denormalized summary tables includes a column that stores data representing a form state for a CRF stored in the row, and where the method comprises constructing a view query that aggregates CRFs based, at least in part, on form state.

19. The computer-implemented method of claim 16, where one or more of the normalized transactional data tables and one or more of the denormalized summary tables includes a column that stores data representing a form state for a CRF stored in the row, and where the method further comprises:

receiving a form state action command that specifies at least one form state and a target CRF;

communicating the form action command to the CRF processing server in a manner that results in the CRF processing server modifying the record corresponding to the target CRF in the one or more normalized transactional data tables to change the form state to the specified form state.

20. The computer-implemented method of claim 19 further comprising:

identifying a stored URL that corresponds to the form state action;

creating a request that includes the identified URL; and posting the request to the CRF processing server.

* * * * *

UNITED STATES PATENT AND TRADEMARK OFFICE
CERTIFICATE OF CORRECTION

PATENT NO. : 9,558,231 B2
APPLICATION NO. : 13/899861
DATED : January 31, 2017
INVENTOR(S) : Shepard et al.

It is certified that error appears in the above-identified patent and that said Letters Patent is hereby corrected as shown below:

In the Specification

In Column 6, Lines 34-37, delete "While the viewer logic 830 is illustrated as a hardware component attached to the bus 808, it is to be appreciated that in one example, the viewer logic 830 could be implemented in the processor 802." and insert the same on Column 6, Line 33, after "thereof." as continuation of the same paragraph.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*